Jan. 11, 1966 G. H. BINGHAM, JR 3,228,819
METHOD OF MAKING LINED MOLDED PLASTIC FOOTWEAR
Filed Oct. 19, 1961 2 Sheets-Sheet 1
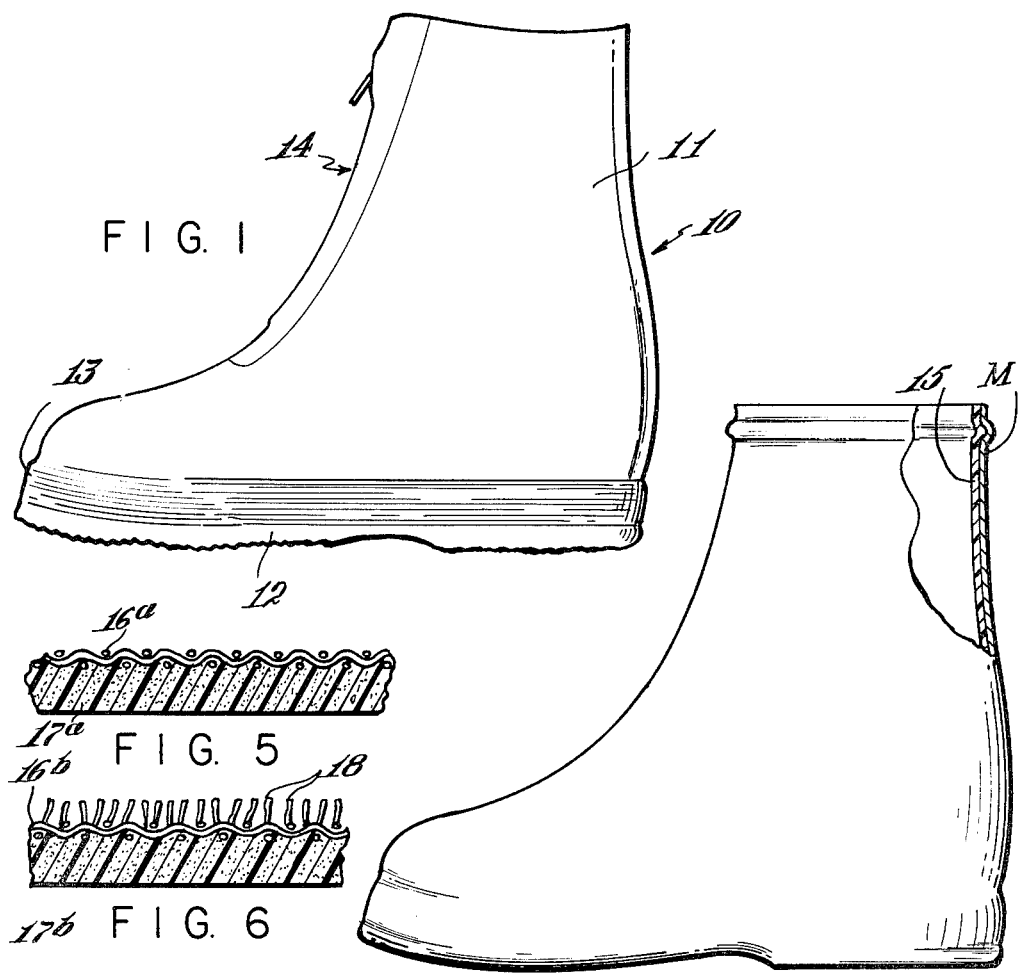
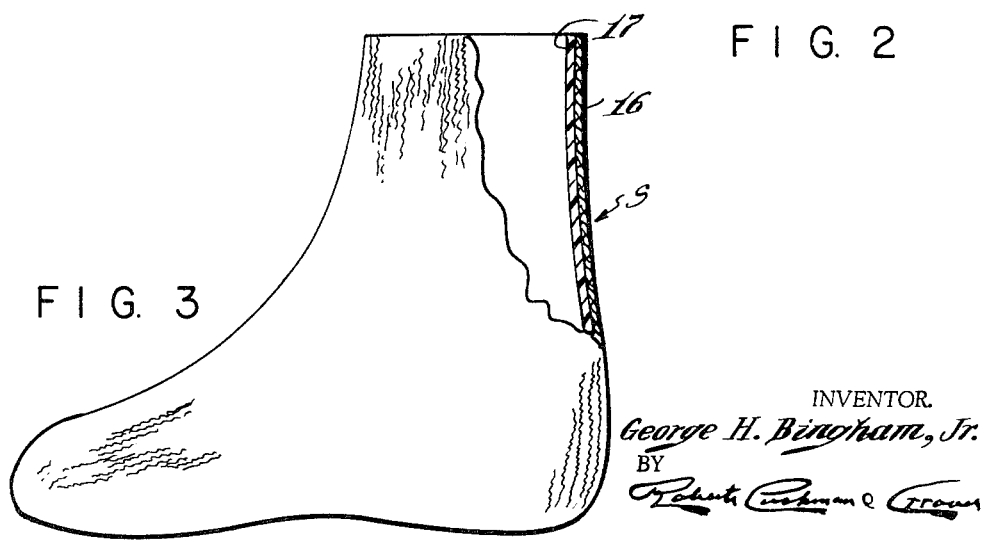
INVENTOR.
George H. Bingham, Jr.
BY
Roberts Cushman & Grover
ATTORNEYS Jan. 11, 1966  G. H. BINGHAM, JR  3,228,819
METHOD OF MAKING LINED MOLDED PLASTIC FOOTWEAR
Filed Oct. 19, 1961  2 Sheets-Sheet 2
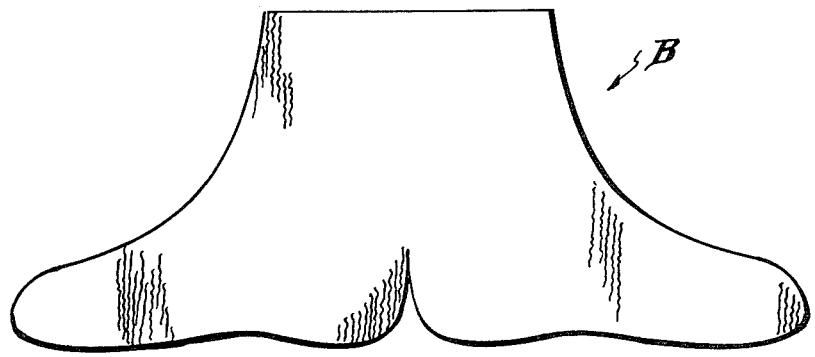
FIG. 4
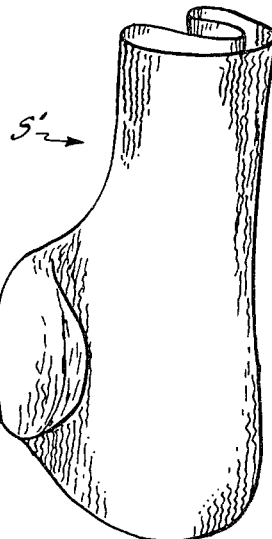
FIG. 7
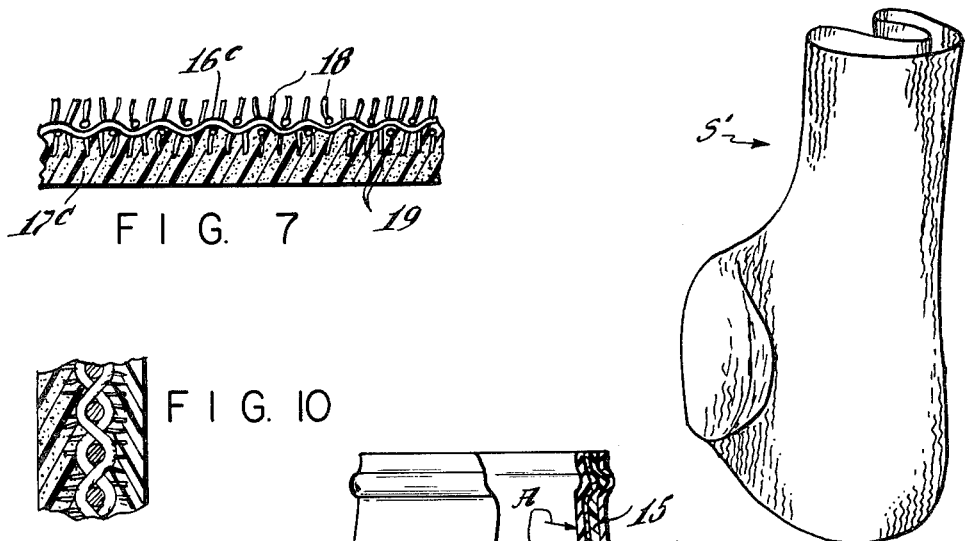
FIG. 10
FIG. 8
FIG. 9
INVENTOR.
George H. Bingham, Jr.
BY
ATTORNEYS United States Patent Office 3,228,819
Patented Jan. 11, 1966

3,228,819
METHOD OF MAKING LINED MOLDED PLASTIC FOOTWEAR
George H. Bingham, Jr., Westminster, Md., assignor to Cambridge Rubber Company, Taneytown, Md., a corporation of Maryland
Filed Oct. 19, 1961, Ser. No. 146,296
5 Claims. (Cl. 156—245)

This invention pertains to waterproof footwear in particular, to a boot or the like having an outer ply of molded synthetic plastic, and relates more especially to a method of lining and/or insulating such a boot or selected portions thereof.

It has heretofore been proposed to provide a boot of the above type with a lining of foamed plastic by the practice of a method which comprises as steps: providing a metallic boot mold of selected size and style with a lining of gelled plastic appropriate to form the outer ply of the boot, then applying to said gelled layer a coating of liquid plastic containing a blowing agent, and concomitantly completing the curing of said layers, while blowing the inner layer, by the application of heat.

While the practice of said prior method results in a boot having an insulating inner layer of foamed plastic, it has certain disadvantages, in particular, that all of the steps of the operation are carried out in the same mold and, further, that the method is not applicable to the employment of certain types of plastic for forming the foamed layer. The present invention has for its object the provision of a method wherein certain of the steps involved in the production of such an insulated boot may be performed outside of the mold in which the outer ply of the boot is made, thus reducing the number of costly molds required in the production of a given quantity of boots per unit of time. The method of the present invention has for a further object the provision of a procedure whereby certain plastic foams may be used which are not readily used in accordance with the prior method. A further object is to provide a method whereby a boot of the above type may have selected areas only provided with insulation as for example the top portion only of the boot leg, the throat-closing gusset, if one be employed, or the insole.

Other and further objects and advantages of the invention will be pointed out in the following more detailed description and by reference to the accompanying drawings wherein:

FIG. 1 is a side elevation, partly in perspective, and merely by way of example, of a boot of a type in which the present invention may be embodied;

FIG. 2 is a side elevation of a conventional boot mold such as is employed in the slush-molding process, of a size and shape useful in making a boot like that of FIG. 1, a portion of the mold being broken away and showing the wall of the mold in section, and with a layer of gelled plastic coating its interior surface;

FIG. 3 is a side elevation, partly broken away and in section, of a sock illustrative of a complete lining for a boot such as that of FIG. 1, as provided in accordance with the present invention;

FIG. 4 is a diagrammatic plan view of a blank, for example of textile fabric, such as may be employed in the manufacture of a sock like that of FIG. 3;

FIGS. 5, 6 and 7 are fragmentary, transverse sections illustrative of various types of material such as may be used in the manufacture of a sock of the general character shown in FIG. 3;

FIG. 8 is a diagrammatic perspective view showing a sock like that of FIG. 3 as having been folded preparatory to its introduction into the mold illustrated in FIG. 2;

FIG. 9 is a view similar to FIG. 2, but showing the lining sock as having been assembled with the plastic coating in the mold; and FIG. 10 is a fragmentary section, to larger scale, through the wall of the boot of FIG. 1, showing the external waterproof ply of plastic and the lining of textile and foam, and diagrammatically indicating the approximate extent to which the foam ply and the plastic ply penetrate the textile ply.

Synthetic plastics, suitable for use in boot manufacture, are well-known, see, for example, patent to Porter, 2,588,571, March 11, 1952, and foamed elastomers, useful for insulating are also well-known, see, for example, patent to Wibbens 2,880,467, April 7, 1959.

Referring to the drawings and, in particular, to FIG. 1, the numeral 10 designates a boot of a type in which the present invention may be embodied, this boot having the upper 11, the outer sole 12 and the simulated foxing strip 13—the outer ply of the boot being such as is made by the slush-molding process, consisting of a seamless layer of a molded synthetic plastic. The upper may have a throat opening, whose location is indicated generally at 14, which, in use, is closed in conventional manner, for example, by means of a slide fastener (not shown).

In the manufacture of such a boot, according to a desirable procedure, there will be provided a mold M (FIG. 2), of the customary type used in slush-molding, made of thin sheet metal, and whose interior is contoured and textured to correspond to the outer surface of the desired boot (but in reverse). In the use of this mold, in the practice of the present method, it is first filled with a fluid plastic of the selected type in creamy liquid condition, and the mold is heated so as to cause a layer of this plastic to gel where it contacts the mold so as to form, when cured, the outer ply 15 of the boot. When a sufficient thickness of the plastic has thus gelled on the inner surface of the mold, surplus plastic is poured out and the mold may then be heated further so as partially to cure this internal layer, although leaving it in a tacky condition.

As an independent operation, and which may be performed concomitantly with or at any time prior to or after the practice of the above-described steps, there is provided a sock S (FIG. 3) of a size and shape appropriate to constitute a lining for the boot to be manufactured—this sock, as shown in FIG. 3, comprising an outer or base ply 16 and an inner insulating ply or layer 17. The outer ply 16 should be of a size and contour and of a material which is sufficiently stretchable so that, by the application of pressure, it may be conformed to the inner surface of the plastic ply 15 (FIG. 2), so as to contact the ply 15 intimately at all points. A material having this characteristic is knitted textile stockinet, although it is contemplated that other materials, for instance bias-cut woven fabric, may be found suitable for the purpose. The inner ply 17 of the sock is of a thermal insulating character, for which purpose a foamed synthetic plastic is particularly suitable. The outer ply 16 may be knitted, for example on a circular knitting machine so as to be seamless. On the other hand, the sock may be made by cutting a blank of the general shape of the blank B (FIG. 4) from flat knitted fabric and which is subsequently seamed to provide a sock of the desired shape.

If seamless, the sock may be provided with the desired layer of foamed material by drawing the sock over a suitable form or last; dipping it in fluid plastic containing a foaming agent; subjecting the coated sock upon the last to appropriate conditions for blowing the coating, so as to develop the desired foam; and then stripping the sock from the last and turning it inside out, thus placing the foam layer at the interior of the sock. If, on the other hand, the sock is made from flat knitted material, from a suitable blank, such as the blank B of FIG. 4, a layer of prefoamed material, such as foamed urethane, may be bonded to the blank before the latter is stitched to form the sock. While the above suggested procedures may be employed in providing the desired sock, it is contemplated that the sock may be made in other ways within the scope of the present invention.

In FIG. 5 the sock material is shown as comprising a simple textile layer 16a and the foam layer 17a—these layers being permanently bonded together.

In FIG. 6 the sock material is shown as comprising the textile ply 16b with the adherent foam ply 17b, but, in this instance, the outer surface of the textile ply is napped to provide outwardly projecting fibers 18.

In FIG. 7 a further modification is illustrated wherein the textile ply 16c is provided with projecting nap fibers 18 on its outer face and with projecting nap fibers 19 on its inner face, the latter fibers being embedded in the foam layer 17c.

Having provided a sock of the type generally illustrated in FIG. 3, this sock is then folded, for example, as shown at S¹ (FIG. 8), so that it may be introduced into the interior of the plastic lined mold M (FIG. 2) without damage to the incompletely cured plastic lining. The introduction of the folded sock into the mold cavity may be assisted by the employment of a suitable implement (not shown) or accomplished entirely by finger manipulation. Having pushed the folded sock down into the mold cavity, the sock is then expanded by the operator, with or without the assistance of suitable implements, or devices, for example, an inflatable rubber sock, and smoothed and pressed into contact with the lining plastic ply 15. The result of this operation is indicated diagrammatically in FIG. 9, where the arrows A indicate the direction of the force which is applied, either by the fingers or an appropriate pressing device, so as to press the outer ply 16 of the sock into intimate contact with the tacky plastic layer 15. When the entire sock has thus been brought into adhering contact with the tacky layer, the mold may then be heated to a suitable temperature for completing the curing of the plastic layer 15—at the same time firmly and permanently bonding the textile outer ply of the sock to the plastic layer 15. The completed shoe may now be withdrawn from the mold M and, as a result of the above procedure, has a strong and durable insulating lining wherein the textile ply imparts strength, not only to the outer plasitc ply but also to the foam ply, thus providing a boot of great durability.

To insure firm adhesion of the textile ply of the sock to the plastic ply 15, sock material such as that of FIG. 6 is desirable since the outer napped surface of the textile ply provides a very intimate and secure bond between the textile ply and the plastic ply. Moreover, if desired, sock material like that of FIG. 7 may be employed, wherein the nap fibers on opposite faces of the textile ply serve to bond the base fabric of the textile ply very firmly, both to the outer plastic ply of the boot and the internal insulating ply.

As illustrated in FIG. 10, the result of the above procedure, in which the plastic layer 15 is partly cured and only tacky when the sock is put in place, is that the plastic of the outer ply 15 of the boot only penetrates the textile ply to a small fraction, less than one-half, of the thickness of the latter, as indicated in FIG. 10. Likewise, when, for example, the sock consists of textile material bonded to pre-foamed urethane, there is little or no penetration of the body of the textile ply 16 by the foam material, as also illustrated in FIG. 10. Thus the foam ply is insulated from the outer plastic ply 15 by the interposition of the porous central body of the textile ply, thus adding to the thermal insulating properties of the boot.

While, as above described, the boot is insulated throughout its entire extent by the employment of a sock such as that suggested in FIG. 3, it is obvious that any selected portion of the boot may be similarly insulated without insulating other parts, since pieces of fabric, of the type illustrated in FIGS. 5, 6 or 7, for example, may be prepared of any desired size and shape appropriate to provide insulation at the desired area, small or large of the boot, and then adhered to the partly cured but tacky plastic ply 15 at the proper location or locations by the application of pressure. Thus, for example, if it be desired to insulate only the upper portion or top of the boot, the insulation may extend downwardly from the upper edge of the boot, for example only to the ankle portion, or, on the other hand, if the boot be one wherein the throat opening is guarded by an expansible gusset, the gusset only may be provided with such an insulating lining. Obviously, if desired, socks such as above described, may be made up in advance of the boot-molding operation and stored for use, or, in fact, prepared and sold to the plastic-boot manufacturer, in sizes, styles, and with types of insulation, according to his specifications.

In the same manner, an insole, one, for example, cut from sheet foam, or composite material—such as illustrated in FIGS. 5, 6 or 7, may be introduced into the plastic-line mold M (FIG. 2) and properly positioned and pressed into contact with the bottom of the embryo boot prior to the completion of fusion.

It is further contemplated, as within the scope of the invention, to provide a boot of the above type with a simple lining, not including an insulating layer, by following the above procedure, except that the sock employed will be devoid of the internal insulating layer. By proceeding in this manner a waterproof boot molded of synthetic plastic by the slush-molding operation may be provided with an interior lining of textile material in a very simple and expeditious manner.

While certain desirable procedures, materials and sequences of steps have herein been described and illustrated by way of example, it is to be understood that the invention is considered as broadly inclusive of all equivalents with respect to materials, method steps and sequences which are within the terms of the claims.

I claim:

1. That method of making an article of footwear which is impervious to moisture and which is thermally insulating, which comprises as steps: providing a hollow mold having a cavity of the shape which is to be imparted to said article, forming upon the inner surface of the mold a layer of partially cured synthetic plastic of a type acceptable to constitute, when fully cured, the outer ply of the desired article, providing a flexible sock of a size and contour such as, when fully expanded, to fit snugly within said layer of partially cured but tacky plastic, said sock comprising a base fabric to whose inner surface adheres a ply of foamed synthetic plastic, folding said sock so that it may be introduced into the interior of the plastic layer while the latter is still tacky, expanding the sock and smoothing its outer surface into initimate contact with the tacky plastic layer, and completing the curing of the plastic layer while simultaneously causing the sock permanently to adhere thereto.

2. The method according to claim 1, wherein the sock consists of textile stockinet having a napped outer face.

3. That method of making an article of footwear which is impervious to moisture and which is thermally insulating, which comprises as steps: providing a hollow mold of the proper size and shape for use in making the desired article and lining the mold with incompletely cured plastic of a type acceptable to form the outer ply of the desired article, providing a flexible sock of a size and shape to constitute a lining for the desired article, said sock comprising an inner layer of completely cured foamed plastic adherent to an outer layer of textile material, inserting said sock within the cavity defined by the plastic lining without disturbing the continuity of the latter, pressing the outer surface of the sock into intimate contact with the partly cured and tacky plastic lining, and firmly and permanently adhering it to the plastic lining while completing the curing of the latter.

4. That method of making an article of footwear which is impervious to moisture, which comprises as steps: providing a hollow mold of the proper size and shape for use in making the desired article and lining the mold with incompletely cured plastic of a type acceptable, when fully cured, to form the outer ply of the desired article, providing a flexible sock of a size and shape to constitute a lining for the desired article, said sock comprising a layer of textile material, inserting said sock within the cavity defined by the partly cured and tacky layer without disturbing the continuity of the latter, pressing the outer surface of the sock into intimate contact with the plastic layer and firmly and permanently adhering it to the plastic layer while completing the curing of the latter.

5. The method of making a seamless waterproof article of footwear comprising a seamless outer ply of cured plastic and a lining for said outer ply comprising a textile fabric having adherent to its inner surface an insulating layer of foamed plastic, and wherein material of the outer waterproof ply constitutes a bond for retaining the lining in place, said method comprising as steps providing a hollow metal mold whose inner surface is an accurate replica, but in reverse, of the outer surface contour of the desired article of footwear, providing the inner surface of the mold with a partially gelled layer of plastic appropriate to constitute the outer waterproof ply of said article, preparing, outside of the mold, a flexible sock appropriate to constitute a lining for the completed article, said sock comprising an outer layer of stretchable textile material having adherent to its inner surface a layer of completely cured foam plastic, so introducing the completed sock, as a unit into the mold, as to avoid damage to the gelled plastic layer within the mold, bringing the outer surface of the sock into intimate adhesive contact with said gelled layer, completing the curing of the gel layer, and withdrawing the completed article from the mold.

References Cited by the Examiner
UNITED STATES PATENTS

| | | | |
|---|---|---|---|
| 2,458,438 | 1/1949 | Snelling | 36—7.3 |
| 2,499,724 | 3/1950 | Compton | 156—31 XR |
| 2,625,499 | 1/1953 | Nebesar | 156—309 XR |
| 2,725,647 | 12/1955 | Hugger | 36—7.3 |
| 2,974,373 | 3/1961 | Streed et al. | 18—59 |
| 3,001,213 | 9/1961 | Stark | 156—313 XR |
| 3,032,828 | 5/1962 | Bethe et al. | 18—59 |

EARL M. BERGERT, *Primary Examiner.*

EDWARD V. BENHAM, HAROLD ANSHER,
*Examiners.*